United States Patent [19]

Cohen

[11] 4,428,360
[45] Jan. 31, 1984

[54] ROOFING SYSTEM FOR SOLAR HEAT COLLECTION AND METHOD FOR FABRICATION THEREOF

[76] Inventor: Howard S. Cohen, 2001 Lincoln St., Berkeley, Calif.

[21] Appl. No.: 336,779

[22] Filed: Jan. 4, 1982

Related U.S. Application Data

[62] Division of Ser. No. 801,511, May 31, 1977, abandoned.

[51] Int. Cl.³ .............................................. F24J 3/02
[52] U.S. Cl. ............................ 126/432; 126/DIG. 2; 126/444; 52/528; 165/116; 165/169; 165/170
[58] Field of Search ................ 126/432, DIG. 2, 444, 126/445, 449, 450; 52/168, 198, 302–304, 518, 533, 750, 528, 530; 29/157.3 D; 526 R; 165/116, 168, 169, 170

[56] References Cited

U.S. PATENT DOCUMENTS

| | | | |
|---|---|---|---|
| 2,624,298 | 1/1953 | Iarren | 52/533 |
| 3,919,998 | 11/1975 | Parker | 126/432 |
| 3,996,918 | 12/1976 | Quick | 126/432 |
| 4,023,321 | 5/1977 | Smith | 52/750 |
| 4,074,705 | 2/1978 | Robinson et al. | 126/432 |
| 4,153,037 | 5/1979 | Isaacson | 126/DIG. 2 |
| 4,163,445 | 8/1979 | Stanger | 126/DIG. 2 |
| 4,221,208 | 9/1980 | Murphy, Jr. | 126/450 |
| 4,244,353 | 1/1981 | Straza | 126/448 |
| 4,291,683 | 9/1981 | Bayles | 126/448 |
| 4,300,535 | 11/1981 | Munroe | 126/DIG. 2 |

FOREIGN PATENT DOCUMENTS

| | | | |
|---|---|---|---|
| 257425 | 5/1963 | Australia | 126/432 |
| 2529095 | 1/1977 | Fed. Rep. of Germany | 126/DIG. 2 |
| 2330974 | 7/1977 | France | 126/DIG. 2 |

*Primary Examiner*—Yeung, James C.
*Attorney, Agent, or Firm*—Howard Cohen

[57] ABSTRACT

A system for collecting solar heat energy includes a plurality of shingle members arranged in shingle fashion on the roof of a stucture or building. Each shingle member is formed of a web of waterproof material which is folded and seamed to define a flat, water-containing cavity therein. Each shingle member includes a flange extending on at least two sides thereof for securing the shingle member to the sub-roof by nails or the like. At least one fluid inlet coupling and fluid outlet coupling is secured to the shingle member in flow communication with the cavity. The fluid coupling members are disposed so that the shingle members may be partially overlapped and connected in open flow communication to the superjacent and subjacent shingle members.

4 Claims, 5 Drawing Figures

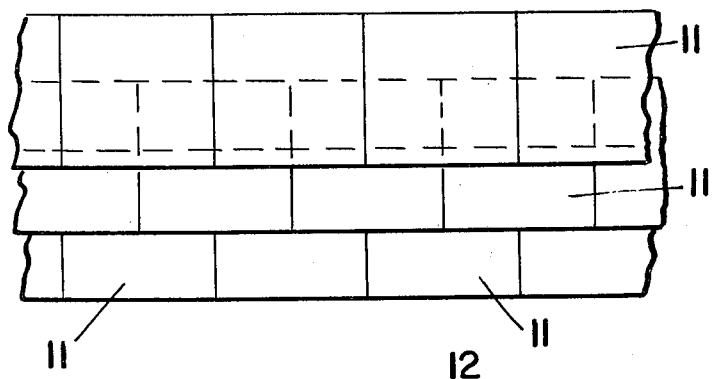
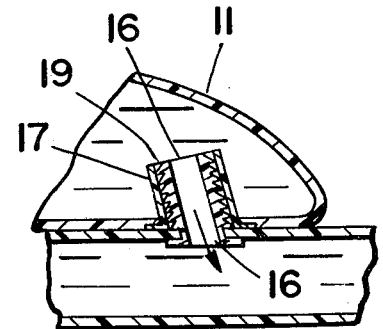
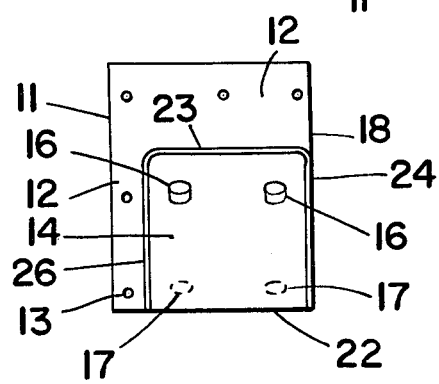
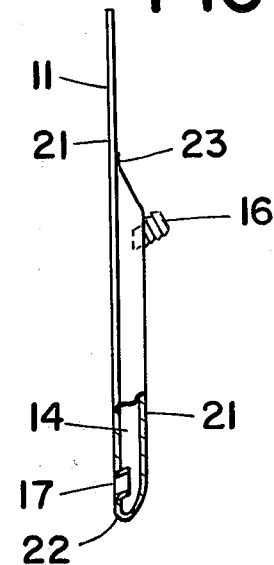
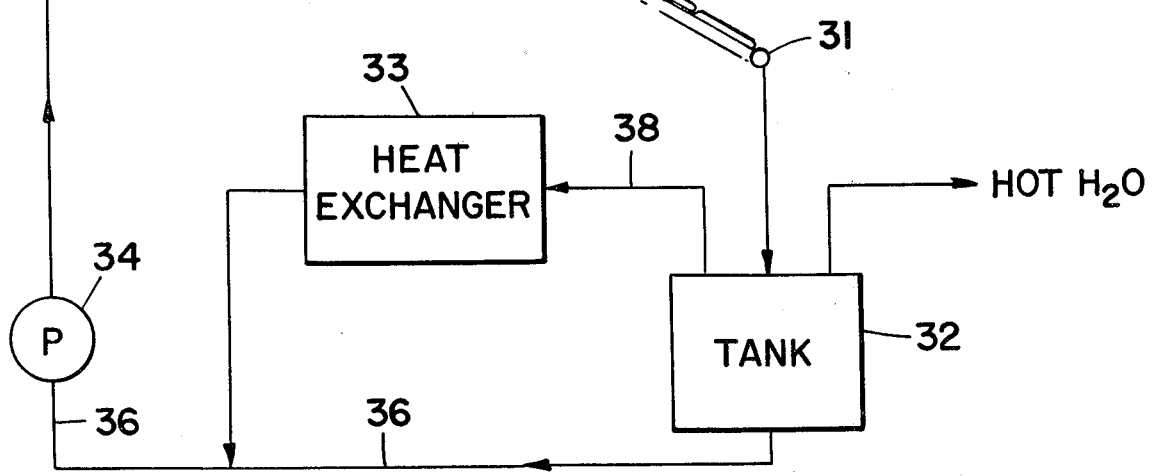

ROOFING SYSTEM FOR SOLAR HEAT COLLECTION AND METHOD FOR FABRICATION THEREOF

REFERENCE TO RELATED APPLICATION

This application is a division of application Ser. No. 801,511, filed on May 31, 1977, abandoned.

BACKGROUND OF THE PRESENT INVENTION

As fossil fuels such as petroleum and coal become depleted, there is increasing interest in renewable energy sources such as solar heat energy. Recent studies have shown that up to one third of the energy consumed in the United States is used for the heating of dwellings and other buildings. Since there is relatively little temperature increase between outside air and indoor, heated air, it has been shown that solar energy collectors can easily meet the energy requirements for this low temperature system.

However, there have been significant practical impediments to the wide-spread implementation of solar heating systems. The most significant impediment has been the cost factor in installing the solar heating system. Generally speaking, these systems have involved the use of rather large solar energy collecting panels. These panels generally comprise a flat, rectangular box in which tubing is disposed to contain a flowing liquid such as water. The box is generally covered with a pane of glass to protect the system from the elements, and to reduce heat loss caused by wind, evaportion, radiation, and the like. Since these panels are large and unwieldy, and the glass that is employed therewith is very fragile, the solar collection panels must be handled by a skilled crew. Furthermore, since the prior art panels are generally installed on the roofs of buildings, they must be hoisted to the installation location by rather large cranes, derricks, and the like. These particular installation factors contribute greatly to the high cost factor.

Furthermore, the prior art solar collection panels are generally installed over an existing roof structure. In a new building or dwelling, the sub-roof and the outer finished roof are usually installed prior to the installation of the solar collection panel. In an existing building, the solar collection panels are usually emplaced over the existing roof structure, whether it be tar, gravel, shingles, etc.

There is an inherent duplication of labor and materials involved in installing solar heat collection panels over an existing roofing structure. That is, the portion of the existing roof which is covered by the solar heat collection panels is protected from the elements by the panels, and serves no useful function. Furthermore, the labor involved in installing the two overlying systems is also duplicated and thus wasteful.

SUMMARY OF THE PRESENT INVENTION

The present invention generally comprises a solar heat collection system which combines the functions of a prior art roofing system and a prior art solar energy collection apparatus. In this way, the present invention overcomes the duplication of effort and materials which is inherent in prior art solar energy collecting apparatus, and significantly reduces the costs incurred in fabricating and installing a solar energy heating system.

The invention includes a plurality of shingle-like members which are disposed on the sub-roof of a building, and which are arrayed in shingle-like fashion. The shingles are formed of a water-proof material, and serve the purpose of protecting the sub-roof and the attendant building or dwelling from the elements.

Each shingle is formed of a web of flexible, water-proof material which is folded and seamed, by thermal or electronic techniques, or by adhesives, to form a generally flat cavity which retains liquid. Each shingle is provided with at least one fluid coupling inlet and one fluid coupling outlet. The fluid couplings may be snap-action devices which are disposed on the shingle so that each shingle may be connected in fluid flow fashion to the superjacent and subjacent shingles. The shingles may also be provided with at least two each of the inlet and outlet fluid coupling devices so that each shingle may be joined in fluid flow fashion to more than one superjacent and subjacent shingle.

The shingle members, when installed on an entire roof or on a large section thereof, are all interconnected by the fluid coupling members to define a fluid flow path. One edge of the shingle matrix, preferably the upper edge on a pitched roof, is supplied with a heat absorbing liquid such as water through a supply manifold. The liquid flows through the coupled shingles under the urging of gravity feed and pump pressure, and is collected at the opposed edge of the matrix by a collection manifold. As the liquid traverses the shingle matrix it absorbs heat from the sun, so that the liquid collected at the collection manifold is much warmer than that presented at the supply manifold.

The liquid from the collection manifold is conducted to a large insulated tank where it is stored for its ultimate use. This use may comprise hot water heating, hot water consumption, or a heat energy reservoir for any other desired use.

A BRIEF DESCRIPTION OF THE DRAWINGS

FIG. 1 is a plan view of the shingle matrix of the solar heat collection apparatus of the present invention.

FIG. 2 is a plan view of a shingle member of the solar heat collection apparatus of the present invention.

FIG. 3 is a partially cut away side view of a shingle member of the present invention.

FIG. 4 is a detailed cross-sectional view of the fluid coupling arrangement of the present invention.

FIG. 5 is a schematic view of the solar heat collection apparatus of the present invention.

DESCRIPTION OF THE PREFERRED EMBODIMENT

The present invention is generally characterized as a solar heat collecting apparatus which also serves as a roofing system for a building. As shown in FIG. 1, it includes a plurality of shingle members 11 which are arrayed in laterally adjacent, vertically overlapping shingle fashion which is well known in the field of roofing systems. Each shingle member 11, as shown in FIG. 2, includes a flange 12 extending around two sides of the shingle, the flange being provided with holes 13 for receiving nails which secure the single to the sub-roofing structure. Each shingle member 11 is provided with a cavity 14 which is a fluid tight chamber. In the preferred embodiment, the chamber 14 extends from the lower edge of the shingle 11 to an upper medial portion thereof, and is spaced inwardly from the side edge of the shingle by the flange 12. A pair of male snap fluid connectors 16 are secured to the shingle at an upper portion of the cavity 14 at the top surface thereof. A pair of female snap fluid connectors 17 are secured to the bottom surface of the shingle at a lower portion of the cavity 14. The fluid connectors 16 and 17 may be of any of the many types of connectors known in the art, and are adapted to be cooperatively engaging. That is, any of the male snap connectors 16 of any shingle 11 are adapted snappingly engage any of the female connectors 17 of any of the other shingles.

The shingles 11 are formed of a heavy duty, waterproof material which withstands the effect of exposure to weather, such as heavy duty vinyl or similar polymer compound. The cavity 14 is offset from a laterally centered disposition on the shingle so that the cavities 14 of adjacent shingles may be disposed in adjacent flush contact. That is, the edge 18 of the shingle which has no flange is adapted to overlay the flange 12 of the adjacent shingle, so that the cavities 14 are in flush contact. In this manner, a water-proof shingle roofing system may be constructed to protect the roof of a building from the elements. As shown in FIG. 1, in the preferred embodiment the rows of shingles are staggered or half-lapped with respect to superjacent and subjacent rows. That is, the seam of one row intersects the medial portion of the shingles of the adjacent rows. Each shingle is connected to superjacent and subjacent shingles by means of the fluid connectors 16 and 17. In the half-lapped configuration shown in FIG. 1, the connectors 16 of each shingle will be joined to the connectors of the two superjacent shingles, and the connectors 17 will be joined to the two subjacent shingles. Thus the shingles which form the roofing matrix are interconnected in many different ways, and any blockage which might occur in one of the fluid couplings or in one of the cavities 14 will not seriously affect the overall flow rate of the shingle matrix. Furthermore, it may be appreciated that any fluid leakage which may occur will be shed by the shingles and caused to run off in the same manner than any precipitation would run off, due to the pitch of the roof.

As shown in FIG. 4, one form of the fluid connector 16 includes a plurality of outer annular rings 19, each having an upper oblique surface. The rings 19 are formed of a resilient material, and are dimensioned to provide an interference fit with the bore of the female connectors 17. The rings 19 permit the male connectors 16 to be easily snappingly engaged with the female connectors 17 in a fluid tight fashion.

With reference to FIG. 3, it may be appreciated that each shingle 11 may be formed of a single rectangular web 21 of pliant water-proof material. The fluid connectors 16 and 17 are first installed in their desired positions, and the web 21 is then folded over on itself so that the lower edge 22 of the shingle 11 is formed. The seams 23, 24, and 26 are then fabricated to seal the folded portions together and form the water tight chamber 14. It may be appreciated that the installation of the fluid connectors and the fabrication of the seams may be carried out by any thermal, electronic, mechanical, or adhesive techniques which are well known in the art. The shingle thus formed is very inexpensive to manufacture, and is as easy to install as any roofing shingle known in the prior art.

As shown in FIG. 5, the shingle 11 may be installed on a roof 28, disposed in a matrix 27. The installation proceeds in much the same way as the method used for standard roofing shingles, except that each new shingle is first connected to the subjacent shingles before it is nailed down, so that the shingle may be located properly to permit the fluid connectors 16 and 17 to be engaged. The shingles are preferably affixed to a roof which is pitched toward the sun, and may partially cover or completely cover that portion of the roof.

A supply manifold or header 29 is secured to the roof in a lateral disposition adjacent to the upper edge of the matrix of shingles 27, and is connected to the inlet couplings 16 of the top row of shingles. A collector manifold 31 is secured to the roof at the lower edge of the matrix 27 and is connected to the outlet coupling 17 of the bottom row of shingles. The collector manifold 31 is connected directly to an insulated tank 32 which stores the liquid which is heated during its passage through the shingle matrix 27. Since this system is primarily designed for use with water as the heat absorbing liquid, hot water may be drawn from the tank 32 as required. Hot water may also be supplied through pipe 38 to a heat exchanger 33. The heat exchanger 33 may be used to heat air or other fluids, or may comprise a hot water heating system for a building. The exhaust from the heat exchanger 33 flows into a supply main 36, which is also connected to the bottom of the tank 32. The supply main 36 is connected to a pump 34 which pumps the cool water up to the supply header 29. The thermostatic controls which actuate the pump 34 and which control the flow through the heat exchanger 33 are well known in the art, and form no part of the present invention. Water from the supply header 29 flows by means of gravity and by the pressure provided by pump 34 downwardly through the matrix 27. As it flows through the matrix, it absorbs heat which is provided by the radiant energy of the sun. Thus the water presented at the collector manifold 31 is much higher in temperature than that supplied by the header 29.

It should be noted that the cavity 14 is extremely flat in comparison to its lateral and longitudinal extent. Thus, the amount of water which is contained within the cavity 14 is slight, and the total amount of water contained within the matrix 27 does not add a significant load to the roofing structure 28. The weight of the water in the cavity 14 does enable the shingles 11 to resist the destructive effects of high winds, and also fire.

Should any leaks develop in the shingle matrix 27, due to accidental destruction or the inevitable effects of weathering, the overlapping construction of the matrix causes the leakage to flow down the matrix and be carried away, much as any precipitation would be shed by the shingle matrix.

It should be emphasized that the system of the present invention permits any handy person to assemble a solar heat collecting system, using only the simplest of tools. Furthermore, the matrix 27, since it is formed of individual shingle members and is assembled on location, may be tailor made to fit any existing or new roof. The system not only provides the protection from the elements which is provided by prior art roofing systems, but also collects the radiant energy from the sun which is received by the roof. Thus, it aids in maintaining a cool temperature within the building during hot, sunny days, and is capable of retaining and resupplying the heat thus received to the building during cold days or cold nights. Furthermore, the roofing system of the present invention, by virtue of the water which is contained therein, provides added protection against fires and increased resistance to disruption by wind.

I claim:

1. A method for forming a roofing system for collecting and utilizing solar heat, using a plurality of water-proof shingle members secured to a roof deck; comprising the steps of forming a generally rectangular web of a water-proof, pliable material, securing a first fluid coupling member extending through a first portion of said web, securing a second fluid coupling member extending through a second portion of said web, folding said web at a fold line to dispose said first and second portions in overlying, adjacent relationship, forming a seam joining said first and second portions to define with said fold line a sealed chamber; arranging said shingle members in overlapping shingle matrix fashion, engaging said first and second coupling members of overlapping adjacent shingle members to connect said chambers in a fluid conducting fashion, and circulating a heat absorbing fluid through said connected chambers.

2. The method of claim 1, wherein the second and third steps include providing a pair of said first fluid coupling members and a pair of said second fluid coupling members.

3. The method of claim 1, further including providing a third portion of said web disposed adjacent to the upper side of said chamber and adapted to be secured to said deck.

4. The roofing system of claim 2, further including providing a fourth portion of said web disposed laterally adjacent to one side of said chamber and adapted to underlie a portion of a laterally adjacent shingle member.

* * * * *